United States Patent
Farnsworth et al.

(10) Patent No.: US 10,620,079 B2
(45) Date of Patent: Apr. 14, 2020

(54) DETECTING FLUID LEAKS IN PRESSURIZED SYSTEMS OF WATERJET CUTTING SYSTEMS

(71) Applicant: Hypertherm, Inc., Hanover, NH (US)

(72) Inventors: James E. Farnsworth, Lino Lakes, MN (US); Cedar J. Vandergon, New Brighton, MN (US); Jon W. Lindsay, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 204 days.

(21) Appl. No.: 15/676,587

(22) Filed: Aug. 14, 2017

(65) Prior Publication Data
US 2018/0045597 A1 Feb. 15, 2018

Related U.S. Application Data (60) Provisional application No. 62/375,273, filed on Aug. 15, 2016.

(51) Int. Cl.
| | |
|---|---|
| *F04B 51/00* | (2006.01) |
| *G01M 3/26* | (2006.01) |
| *F04B 53/02* | (2006.01) |
| *G01M 3/28* | (2006.01) |
| *F04B 53/22* | (2006.01) |
| *G01M 3/38* | (2006.01) |
| *F04B 53/14* | (2006.01) |
| *F04B 9/103* | (2006.01) |
| *F04B 53/00* | (2006.01) |
| *F04B 49/10* | (2006.01) |
| *B26F 3/00* | (2006.01) |

(Continued)

(52) U.S. Cl.
CPC ............. *G01M 3/26* (2013.01); *B24C 7/0007* (2013.01); *B26F 3/004* (2013.01); *F04B 9/103* (2013.01); *F04B 49/10* (2013.01); *F04B 51/00* (2013.01); *F04B 53/008* (2013.01); *F04B 53/02* (2013.01); *F04B 53/143* (2013.01); *F04B 53/22* (2013.01); *G01M 3/2869* (2013.01); *G01M 3/2876* (2013.01); *G01M 3/38* (2013.01); *B24C 1/045* (2013.01)

(58) Field of Classification Search
CPC ....... B24C 1/045; B24C 7/0007; B26F 3/004; F04B 9/103; F04B 49/10; F04B 51/00; F04B 53/008; F04B 53/02; F04B 53/22; F04B 53/143; G01M 3/26; G01M 3/28; G01M 3/2869; G01M 3/2876; G01M 3/38

See application file for complete search history.

(56) References Cited

U.S. PATENT DOCUMENTS

| | | |
|---|---|---|
| 3,485,085 A | 12/1969 | Hawkins, Jr. |
| 3,564,526 A | 2/1971 | Butts |
| 4,873,863 A | 10/1989 | Bruhl et al. |

(Continued)

FOREIGN PATENT DOCUMENTS

JP 63-253229 A 10/1988

*Primary Examiner* — Nguyen Q. Ha
(74) *Attorney, Agent, or Firm* — Proskauer Rose LLP (57) ABSTRACT

In some aspects, waterjet cutting pressurization systems can include a water pump: (i) having a pressurization chamber and (ii) having a high-pressure water seal maintaining water pressure within the chamber; and a leak detector in fluid communication with the high-pressure water seal and configured to monitor a leak rate of a fluid from the high-pressure water seal.

41 Claims, 7 Drawing Sheets

(51) Int. Cl.
*B24C 7/00* (2006.01)
*B24C 1/04* (2006.01)

(56) References Cited

U.S. PATENT DOCUMENTS

| | | | | |
|---|---|---|---|---|
| 6,086,070 | A * | 7/2000 | Tremoulet, Jr. | F04B 53/164 |
| | | | | 277/586 |
| 7,073,794 | B2 * | 7/2006 | Bock | G01M 3/045 |
| | | | | 277/320 |
| 9,080,922 | B2 | 7/2015 | Howard et al. | |
| 9,927,322 | B2 * | 3/2018 | Laramee | G01M 3/2869 |
| 10,054,226 | B1 * | 8/2018 | Watson | F16J 15/002 |
| 10,288,051 | B2 * | 5/2019 | Andersen | F04B 19/22 |
| 2003/0015840 | A1 | 1/2003 | Davis | |
| 2008/0006088 | A1 | 1/2008 | Wago et al. | |
| 2008/0019851 | A1 * | 1/2008 | Hopkins | F04B 53/02 |
| | | | | 417/415 |
| 2009/0211341 | A1 | 8/2009 | Witt | |
| 2015/0251331 | A1 | 9/2015 | Vandergon et al. | |
| 2016/0298614 | A1 * | 10/2016 | Gaillard | F04B 9/113 |

\* cited by examiner

DETECTING FLUID LEAKS IN PRESSURIZED SYSTEMS OF WATERJET CUTTING SYSTEMS

RELATED APPLICATIONS

This application claims the benefit of U.S. Provisional Patent Application Ser. No. 62/375,273 filed Aug. 15, 2016, entitled "Active Drip Detection Method for Waterjet Pressure Intensifiers," the contents of which are hereby incorporated herein by reference in their entirety.

TECHNICAL FIELD

This disclosure relates generally to liquid pressurization systems and processes, and more specifically to detecting fluid leaks and managing leaking fluid flow within pressurized systems, such as waterjet cutting systems.

BACKGROUND

Liquid pressurization systems produce high pressure (e.g., up to 90,000 pounds per square inch or greater) streams of liquid for various applications. For example, high pressure liquid may be delivered to a liquid jet cutting head, a cleaning tool, a pressure vessel, or an isostatic press. In the case of liquid jet cutting systems, liquid can be forced through a small orifice at high velocity to concentrate a large amount of energy on a small area. To cut hard materials, a liquid jet can be "abrasive" and include abrasive particles for increasing cutting ability. As used herein, the term "liquid jet" includes any substantially pure water jet, liquid jet, and/or slurry jet. However, the systems and methods described herein can apply to other systems that use liquid pumps or similar technology.

To generate a high pressure liquid stream, a liquid pressurization system can use a high-pressure intensifier pump. A high-pressure intensifier pump typically uses a piston (e.g., plunger) to draw a volume of liquid into a cylinder on an intake stroke and pressurize the volume of liquid on a pressure stroke. As the plunger reciprocates within the cylinder, it passes through a seal assembly. The seal assembly prevents pressurized liquid in the cylinder from flowing past the plunger and leaking from the pump. The pump can also include various other sealing components arranged at various locations throughout the pump to limit liquid from flowing from the cylinder other than through its intended output. High-pressure fluid from the pump can be collected and provided to a tool to perform a desired function, e.g., cutting or cleaning.

Due to the cyclical nature of the system, many of the moving parts (e.g., seals, check valves, etc.) of the intensifier have a limited lifetime, eventually wearing out/failing as they are cycled between extreme pressures. Current seal assemblies can wear significantly with pump use and therefore require frequent replacement, which can lead to system downtime as worn seals are investigated and leaking seal assemblies are replaced.

SUMMARY

In some aspects, waterjet cutting pressurization systems can include: a water pump: (i) having a pressurization chamber and (ii) having a high-pressure water seal maintaining water pressure within the chamber; and a leak detector in fluid communication with the high-pressure water seal and configured to monitor a leak rate of a fluid from the high-pressure water seal.

Embodiments can include one or more of the following features.

In some embodiments, the leak detector is configured to measure a number of discrete drops of the fluid leaking from the high pressure water seal. In some embodiments, the leak detector comprises an optical sensor. In some embodiments, the leak detector determines a volumetric flow rate of the fluid from the seal. In some embodiments, the leak detector is configured to measure a temperature of the fluid. In some embodiments, the leak detector is in communication with a computerized controller. In some embodiments, the leak detector is in communication with a graphical user interface (GUI). In some embodiments, the leak detector being configured to monitor a leak rate of a fluid from the high-pressure water seal comprises being configured to detect an extended flow of fluid.

In some embodiments, the pressurization system includes two or more leak detectors, each leak detector configured to monitor a leak rate of the fluid from a different seal. In some cases, the pressurization system includes three or more leak detectors.

In some embodiments, the systems also include a second leak detector coupled to the pressurization chamber.

In some embodiments, the pressurization chamber is a first pressurization chamber and the water pump has a second pressurization chamber mechanically coupled to the first pressurization chamber. In some cases, the systems can include a second seal maintaining water pressure within the chamber within the second pressurization chamber and a second leak detector configured to monitor a leak rate of the fluid from the second seal within the second pressurization chamber.

In some embodiments, systems can include a leak collector tray that captures leaks from the water pump and directs them to the leak detector. In some embodiments, systems can define or include a fluid flow path coupled to the water pump to convey the fluid from the high-pressure water seal to the leak detector.

In some embodiments, the system is a high pressure liquid cutting system.

In some aspects, waterjet cutting pressurization systems can include: an intensifier water pump comprising: (i) a first pressurization chamber and a first high-pressure seal disposed within the first pressurization chamber; and (ii) a second pressurization chamber and a second high-pressure seal disposed within the second pressurization chamber; and a first leak detector fluidly coupled to the first high-pressure seal; and a second leak detector fluidly coupled to the second high-pressure seal.

Embodiments can include one or more of the following features.

In some embodiments, systems can include a fluid flow component coupled to the first pressurization chamber and a third leak detector fluidly coupled to the fluid flow component. In some cases, the first high-pressure seal comprises a high-pressure dynamic seal and the fluid flow component comprises a high-pressure static seal. For example, the fluid flow component can include at least one of: a check valve, tubing, or a high-pressure fitting.

In some embodiments, the systems includes a second fluid flow component coupled to the second pressurization chamber and a leak detector fluidly coupled to the second fluid flow component coupled to the second pressurization chamber. In some cases, the second high-pressure seal includes a high-pressure dynamic seal and the second fluid flow component coupled to the second pressurization chamber includes a high-pressure static seal. In some cases, the second fluid flow component coupled to the second pressurization chamber includes one of: a check valve, tubing, or a high-pressure fitting.

In some aspects, electronic methods of determining a flow rate of a fluid leaking from a leaking member within a pressurized chamber of a pump can include: providing a drop detector fluidly coupled to the pressurized chamber; routing drops of the fluid from the leaking member within the pressurized chamber to the drop detector; measuring, using the drop detector, a number of drops of the fluid expelled from the leaking member and passing by the drop detector; sending an electronic signal indicating the number of drops from the drop detector to a computerized controller; determining, using the computerized controller, an estimated flow rate of the fluid based on the measured number of drops; and responsive to determining that the estimated flow rate of the fluid exceeds a threshold, issuing a fault signal.

Embodiments can include one or more of the following features.

In some embodiments, the method is performed by a waterjet cutting system. In some embodiments, the drop detector includes an optical sensor. In some embodiments, the measuring the number of drops includes detecting a length of individual drops. In some embodiments, the determining the estimated flow rate includes estimating a volume of a drop. In some embodiments, methods also include collecting a series of drops of the fluid in a collection tray prior to the routing of individual drops to the drop detector. In some embodiments, the issuing the fault signal includes providing a signal on a graphical user interface (GUI). In some embodiments, the leaking member includes a chamber seal disposed within the pressurized chamber. In some embodiments, the measuring the number of drops includes measuring a change in voltage of an electronic signal generated by a sensor within the drop detector. In some embodiments, the fault signal includes a watch warning in response to determining that the estimated flow rate exceeds a threshold of at least about 5 milliliters per minute. In some embodiments, the fault signal includes an order to replace the leaking member in response to determining that the estimated flow rate exceeds a threshold of at least about 15 milliliters per minute.

In some embodiments, methods further include: providing a second leaking member disposed in a second pressurized chamber of the pump; providing a second drop detector fluidly coupled to the second pressurized chamber; routing drops of a second fluid from the second leaking member to the second drop detector; measuring, using the second drop detector, a number of drops of the fluid expelled from the second leaking member and passing by the second drop detector; sending an electronic signal indicating the number of drops from the second drop detector to the computerized controller; determining, using the computerized controller, an estimated flow rate of the fluid based on the measured number of drops; and responsive to determining that the estimated flow rate of the fluid exceeds a threshold, issuing a fault signal.

In some embodiments, the fault signal corresponds to a remaining usable life of the leaking member. In some embodiments, the fault signal alerts a user that the leaking member has failed and needs to be replaced. In some embodiments, the fault signal alerts a user that the leaking member has failed and needs to be replaced. In some embodiments, the estimated flow rate of the fluid corresponds to a remaining usable life of the leaking member.

In some aspects, drop collection and distribution trays for a waterjet cutting system to receive one or more fluids leaking from an intensifier pump of the waterjet cutting system can include: a settlement pan divided into: i) a first section receiving a first leaking fluid from a first leaking member within the intensifier pump and ii) a second section receiving a second leaking fluid from a second leaking member within the intensifier pump; a partition separating fluid between the first and second sections; a set of walls surrounding the settlement pan to form: i) a first fluid reservoir collecting the first fluid and permitting particulates in the first fluid to settle and accumulate and ii) a second fluid reservoir collecting the second fluid and permitting particulates in the first fluid to settle and accumulate; a first drain located in the first section of the settlement pan; a second drain located in the second section of the settlement pan; and an attachment mechanism for directly attaching the tray to a waterjet jet cutting system.

In some embodiments, the attachment mechanism is configured to attach to the waterjet cutting system freely of a use of tools or fasteners. In some embodiments, one or more of the first and second drains are positioned at an elevation above a lower surface of the settlement pan. In some cases, the positioning of the drains at an elevation above the lower surface of the settlement pan forms an area in which particulates settle and accumulate. In some embodiments, the first drain and/or second drain are configured to deliver the leak fluid to a drop counter. In some embodiments, the attachment mechanism is configured to be directly attached to an intensifier of the waterjet cutting system.

Embodiments described herein can have one or more of the following advantages.

The systems and methods described herein can be used to more easily monitor the condition of one or more seals (e.g., sealing components or members (e.g., fluid flow components (e.g., check valves, tubing, fittings, adapters, cylinders))) within a system without requiring a user to be present (e.g., to visually inspect a system). This can make a system more user friendly than some conventional systems in which a seal condition is generally inspected and determined by visually checking an amount of fluid leaking from the system (e.g., forming puddles). For example, in some conventional systems, leakage from weep holes in seals falls onto a deck of an intensifier pump and an operator determines whether the leak requires service by counting a number of drops per stroke. That is, many intensifier pump components typically have weep holes at key locations to allow leaked/escaped fluids to drain out of the system rather than build up in dangerous locations (e.g., behind seals or installed components). As a component begins to approach the end of its service life, its respective weep hole will begin to drip oil or water which indicates to a user and/or technician that the internal component will soon require service. For example, the fluid flow rate from a weep hole is one of the criteria for determining if (e.g., estimating if) an intensifier should be serviced. Currently, flow rate is commonly measured by counting the number of drops from a weep hole over a given system cycle or time period. For example, "1 drop per stroke" can be a common threshold indicator that a system is ready for service. However, this or any criteria/system requiring that drops be visually counted by an observer is imperfect because (1) drops can have a different volume depending on fluid viscosity, (2) the measurement is subjective and dependent on the observer, and (3) it requires that someone is present to observe it (e.g., it is not continuously monitored). Also, by routing the leaking fluid as discussed herein, the system can be cleaner and more user friendly as there is less pooling liquid on a deck of the system.

Additionally, the systems and methods described herein can help a user more easily determine which particular component may be failing. Whereas in some conventional systems, fluid may leak from the system, but a user may not be able to readily discern which seal is actually leaking. More specific leak detection can be achieved, in part, by using dedicated leak detectors for each type of seal being monitored.

In some aspects, the systems and methods described herein can provide a user with a better understanding of the condition of a seal and how close the seal may be to fully failing, which can help a user better know what type of maintenance is needed and when it is needed. For example, as discussed below, based on a rate of fluid flow from a seal, the system can alert a user that a seal requires or will require maintenance or that the seal has completely failed and that the system requires immediate repair.

DETAILED DESCRIPTION

In some aspects, electronic monitoring of fluid leaking from various sealing components within an intensifier pump can be implemented to better track usable life of the sealing components and predict when such components will fail in order to provide better maintenance to the system and reduce downtime.

Figure 1:
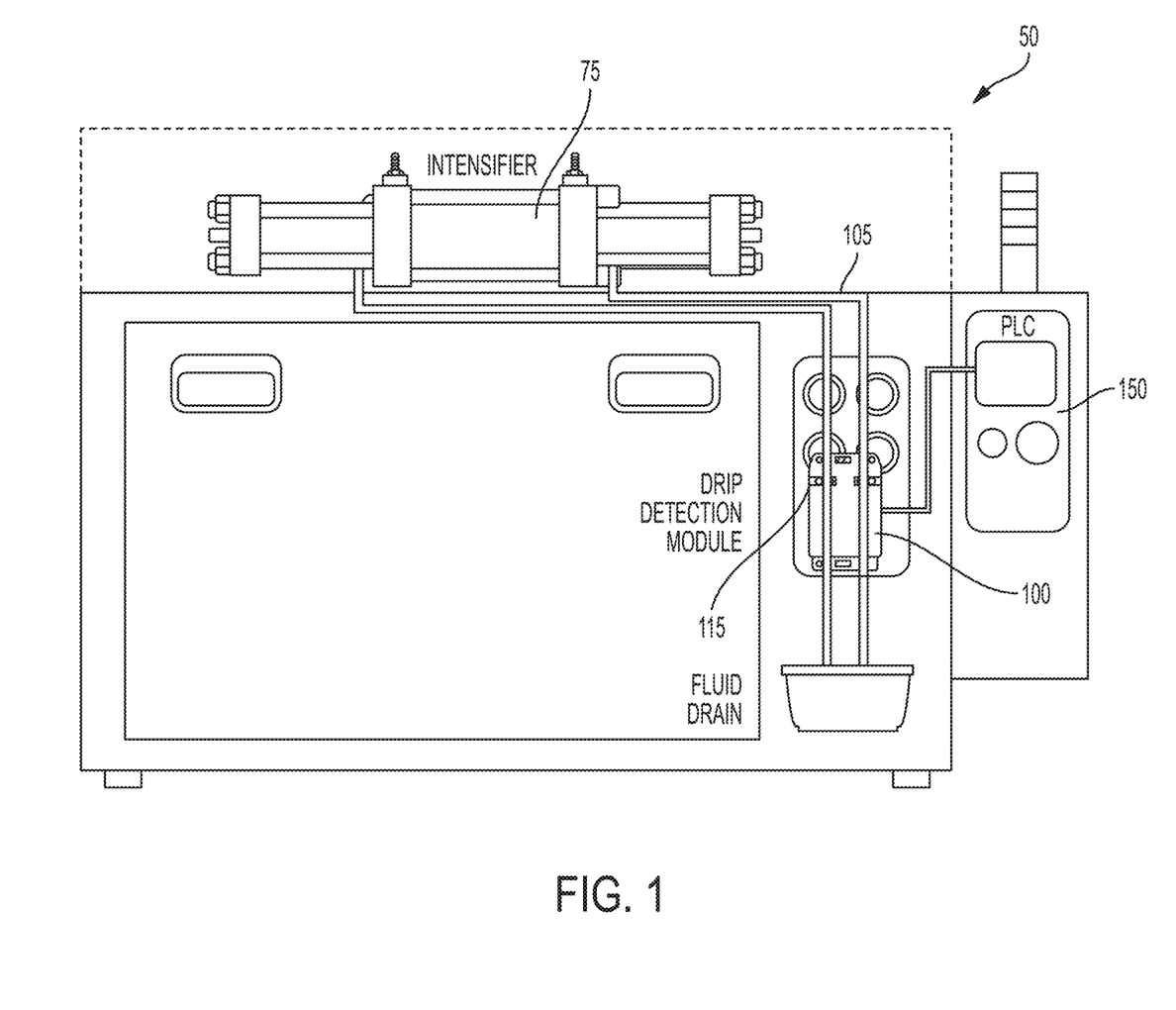
FIG. 1 is a diagram of an example liquid pressurization system of a waterjet cutting system having a leaking fluid detection system.
Figure 2:
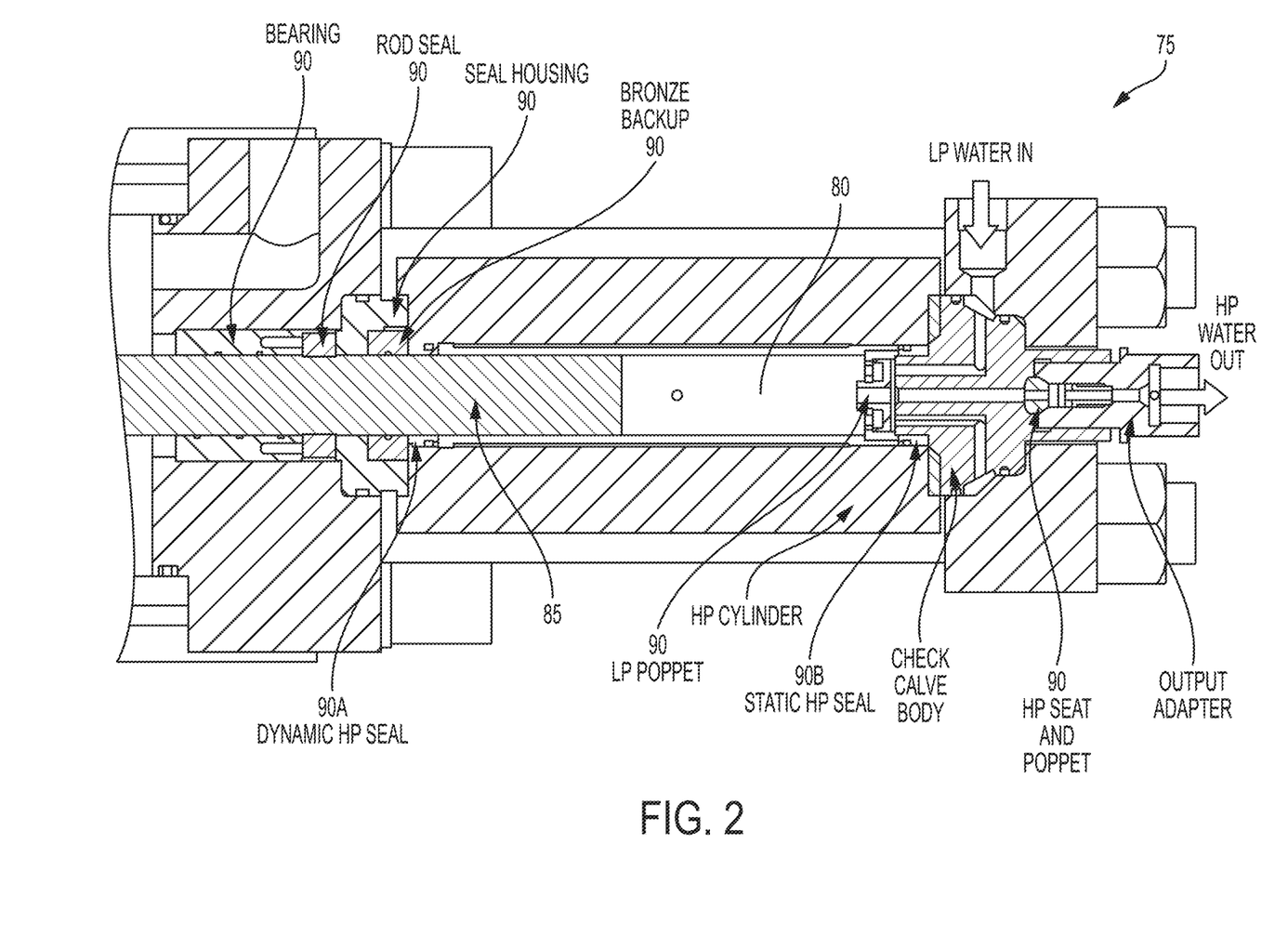
FIG. 2 is a cross sectional view of an example fluid pumping device (e.g., high-pressure intensifier pump (e.g., intensifier)), illustrating a variety of fluid seals and other members that retain or direct fluid within the pumping device.

For example, referring to FIGS. 1-3C, a fluid handling system (e.g., waterjet cutting system (e.g., a high pressure liquid cutting system)) can include a waterjet cutting pressurization system 50 having a water pump (e.g., intensifier, high pressure pumping system) 75 and a fluid leak detection system 100 that can be used to track an amount of fluid leaking from the water pump 75. For example, the water pump 75 includes a pressurization chamber 80 in which a material processing fluid, such as water, is pressurized to a high pressure (e.g., 60,000 psi to 90,000 psi). In some cases, high pressure fluid can be generated within the chamber 80 using a reciprocating piston (e.g., plunger) 85. To help maintain pressure within the pressurization chamber 80, the water pump 75 typically includes one or more sealing components (e.g., fluid seals, high-pressure water seals, poppets) that help limit fluid from inadvertently flowing from the pressurization chamber 80 other than from an output. As the sealing components degrade with wear, fluid can start flowing (or a flow rate can increase) from the sealing components, the presence of which can be used to predict or determine the failure of the sealing component. In some cases, the sealing components can include a weep seal component having weep holes that are configured to permit a small amount of fluid to flow from the seal during normal operations, but the flow of fluid can increase (e.g., significantly increase) as the component begins to fail. In some embodiments, fluids from the weep holes are routed to a leak detector or routed to a port to be conveyed to a downstream leak detector for monitoring. FIG. 2 illustrates various example sealing components that can be monitored using the systems and methods described herein.

Figure 3A:
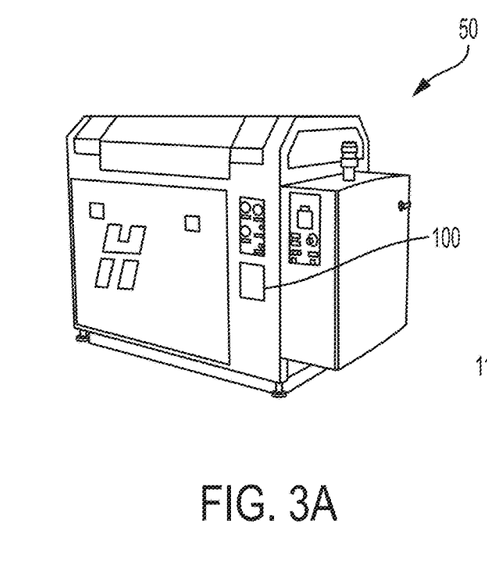
FIG. 3A is a perspective view of another example liquid pressurization system of a waterjet cutting system having a leaking fluid detection system.

To monitor the fluid flow from a sealing component and track or predict failure of the sealing component, the cutting system can include a leak detection system 100. The leak detection system 100 can include a leak detector 115 in fluid communication with (e.g., fluidly coupled to) the sealing component to be monitored and be configured to monitor a leak rate of a fluid from the sealing component. For example, the leak detection system 100 can include a flow path (e.g., tubing, piping, conduit) 105 to receive leaking fluid from the pump 75 and convey (e.g., deliver) it to the leak detector 115 for analysis. For example, in some embodiments, fluids from a weep hole can be routed to a leak detector and/or converted to a port to be routed to a downstream leak detector. In some embodiments, fluidly coupled can include a fluid drop falling from the intensifier pump 75 and into the drip pan (e.g., the pan 500 described below) to be routed to the leak detector.

In addition to the sealing components described above, the systems and methods described herein can be used to monitor fluids leaking from any of various other fluid handling components. For example, a leak detector can be fluidly coupled to a fluid flow component coupled to the first pressurization chamber and a leak detector fluidly coupled to the fluid flow component. For example, the fluid flow component can include one or more of a check valve, tubing, a fitting (e.g., a high-pressure fitting), high pressure cylinder.

Any of various systems and techniques can be implemented to monitor the leak rate of the fluid from the sealing component. For example, in some embodiments, the leak detector (e.g., fluid detection sensor, drop counter, drop detector, drop counter, fluid flow sensor) 115 is configured to measure a number of discrete drops (e.g., volumes, droplets, drips) of the fluid leaking from the sealing components and determine a frequency of drops passing by. For example, for a given (e.g., consistent) size of drops flowing by the leak detector, a frequency at which drop pass by can be used to determine a liquid flow rate of fluid being expelled.

In some cases, a drop or volume of liquid can be detected (e.g., counted) by detecting a leading edge (e.g., a front surface) of the drop or volume and then detecting the trailing edge (e.g., a rear surface) of the drop or volume as it passes by the sensor. In some examples, a drop of volume of liquid can be determined (e.g., estimated) by assuming a consistent (e.g., constant) fluid flow rate. In some embodiments, a leak detector can measure (e.g., detect) a length of individual drops and, based on a liquid flow rate (e.g., velocity (e.g., an assumed constant velocity)), a volume can be determined. Additionally or alternatively, in some embodiments, the leak detector 115 is configured to measure an extended flow of fluid (e.g., an on-going flow of fluid, such as a flushing flow). In some examples, the leak detector 115 can include a sensor to determine a volumetric flow rate of the fluid being expelled from the sealing component. In some examples, the sensor can determine or predict that an on-going flow of fluid is flushing by the sensor by observing noise in a signal from the sensor for a prolonged period. That is, in some cases, typically, as a discrete drop flows by a sensor, the signal output is fairly crisp (e.g., well-defined, substantially binary measurement). Whereas, when a constant rush of fluid flows by the sensors, the signal output by the sensor can include prolonged noise as the varied flush of fluid flow inhibits the sensor from producing a clean binary signal.

Additionally or alternatively, the leak detector 115 can include a sensor that is configured to measure or predict a temperature of the fluid flowing through the flow path 105 and being analyzed. In some cases, predicting the temperature of the leaking fluid can be useful as another indication that an upstream sealing component may be failing, which causes the temperature of the fluid passing therethrough to increase. For example, temperature sensors, and obtained information regarding fluid temperatures, can be useful to provide an even more comprehensive understanding of intensifier consumable lifetime, further improving the options and functions that could be managed by the system control software.

In some examples, the leak detector 115 can include an optical sensor to visually monitor a fluid flow through the flow path 105. For example, the optical sensor can include an optical gate where an output voltage of an electronic signal generated by the sensor changes in response to a light path being obstructed. An example detector includes a tube liquid sensor by Optek Technology of Carrollton, Tex.

Thus, in some cases, the flow path 105 can be formed by a transparent tubing that permits optical waves from the optical sensor to pass therethrough. Any of various types of transparent tubing can be used. For example, polyurethane tubing (e.g., McMaster Carr® part no. 5195T64, Polyurethane tubing, 85A durometer), MFA (tetrafluoroethylene perfluoromethylvinylether) tubing (e.g., McMaster Carr® part no. 2133T2 MFA tubing, 60D durometer), FEP (fluorinated ethylene propylene) tubing (e.g., McMaster Carr® part no. 2129T13 FEP tubing, 60D durometer), or other types of tubing can be used. In some embodiments, the tubing by which fluid is delivered to the leak detector can include a hydrophobic tubing, which can help fluid flow more easily therethrough.

Figure 4:
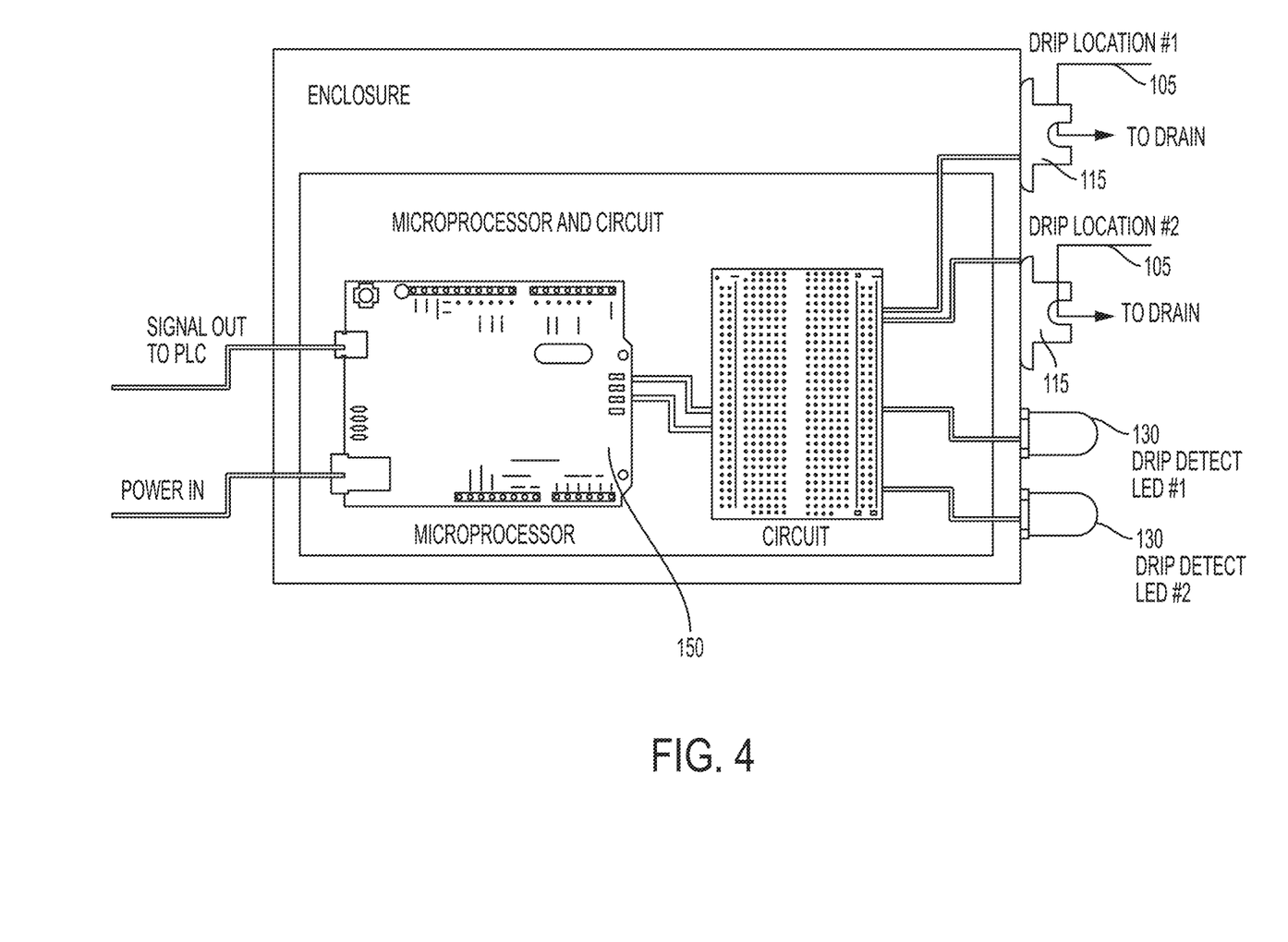
FIG. 4 is an example diagram of an electronic control system for electronic system to determine flow rate of a leaking fluid.

As depicted in FIG. 4, the leak detector 115 is typically in communication (e.g., wired or wireless communication) with a computerized controller (e.g., a microprocessor) 150. The computerized controller 150 can be configured to monitor the presence of leaking fluid using the leak detector 115 and based on observed leaks, as discussed below, control operation of the waterjet cutting system. For example, in some cases, the controller 150 can issue service recommendations or warnings, or shut down the system based on an observation or prediction that one or more sealing components have failed or are about to fail.

Additionally, in some cases, the leak detector 115 is in communication (e.g., wired or wireless communication) with a graphical user interface (GUI). For example the waterjet system can include a monitor (e.g., computer screen) or one or more indicators (e.g., alert lights).

In some embodiments, by obtaining and processing flow rate data from each leaking component, pump control software can provide early leak detection, user alarms, graphical presentation of current leak status, and determination and representation of remaining life of some consumables.

Briefly referring specifically to FIG. 2, the pump 75 can include various sealing components (e.g., bearings, rod seals, seal housing, bronze backup seals, high pressure or low pressure poppet valves, check valve bodies, or other components) 90 to help maintain pressure within, or limit fluid flow from, the pressurization chamber 80 or to help facilitate fluid delivery from the chamber 80. In some embodiments, the leak detection system 100 can include two or more leak detectors 115, where each leak detector 115 is configured to monitor a leak rate of the fluid from a different seal. For example, the leak detection system 100 can include a leak detector 115 to monitor a leak rate from a dynamic high pressure seal (e.g., a seal that interfaces with the moving piston plunger) 90A and a different leak detector 115 to monitor a leak rate from a static high pressure seal 90B, where both of these seals are disposed on a common side of a pump 75.

In some embodiments, the pump 75 can include a second pressurization chamber mechanically coupled to the first pressurization chamber and a second set of pumping components (e.g., pumping piston plunger) and seals. In some cases, the reciprocating pistons in each pressurization chamber can be coupled to one another or be formed from a unitary component. In some examples, the pump 75 can include a second seal maintaining water pressure within the chamber within the second pressurization chamber and a second leak detector configured to monitor a leak rate of the fluid from the second seal within the second pressurization chamber. Thus, in some examples, the leak detection system 100 can include three or more leak detectors 115 to monitor a fluid leak rate, and therefore also predict a failure of, three or more different sealing components. In some cases, the system can be configured to monitor seals from different pressure chambers of the pump, such as a first dynamic seal and a first static seal on one side of a pump (e.g., a first pressure chamber) and then a second dynamic seal and a second static seal on an opposite side of the pump (e.g., a second pressure chamber).

Figure 3B:
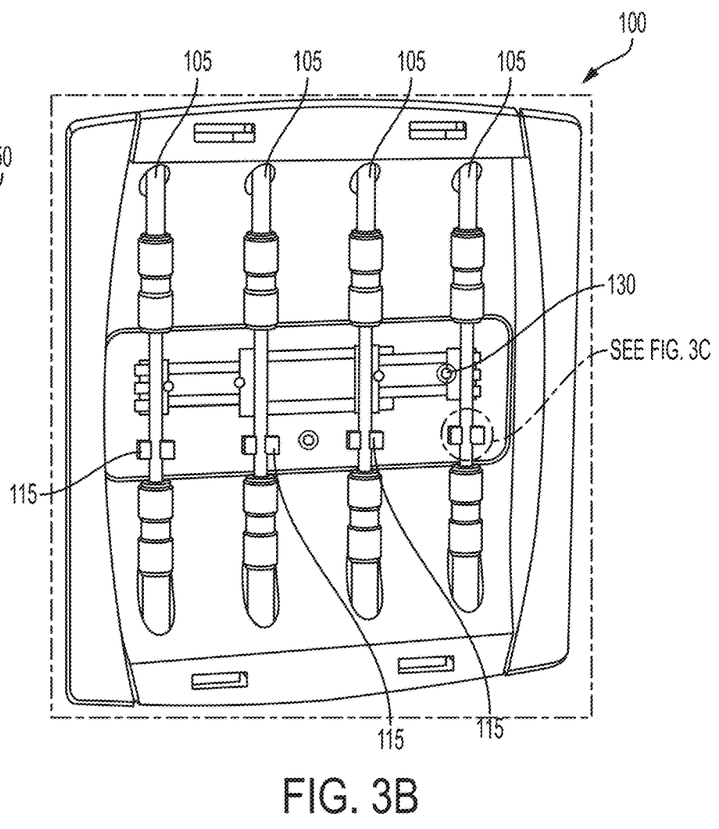
FIG. 3B is a perspective view of an example electronic system to determine flow rate of a leaking fluid from one or more seals or other leaking members.
Figure 3C:
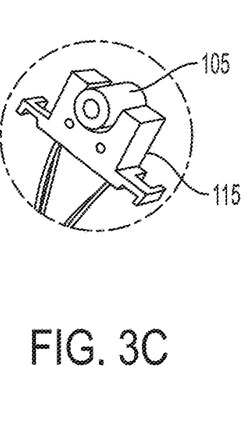
FIG. 3C is a perspective view of an example fluid flow detection device that can be used in the electronic system to determine flow rate of a leaking fluid.

For example, as depicted in FIG. 3B, systems can include multiple (e.g., 2, 3, 4, or more) leak detectors 115 where each leak detector is configured to track leaking fluid from a different sealing component of a pump. In the example of FIG. 3B, the system includes 4 leak detectors 115, two for each pressurized chamber of the system. Generally, multiple leak detectors can be configured to monitor multiple sealing components. For example, the two leak detectors per chamber can be configured to monitor a static seal and a dynamic seal in each chamber. The system can include one or more visual indicators 130 (e.g., one indicator for each leak detector) that can be used to indicate various scenarios to a user. For example, the indicators 130 can emit a signal when a drop is detected. Alternatively or additionally, the indicators 130 can emit a signal when the system determines that a sealing component has failed or is about to fail.

Separately or in combination with the pressurization system features described above for monitoring leaking components, fluid handling systems (e.g., waterjet cutting systems) can include one or more fluid collection trays to collect and route leaking fluids coming from various components within the system. For example, referring to FIGS. 6-8, fluid handling systems can include a leak collector tray (e.g., a drop collection and distribution tray) 500 that captures leaking fluid from components of the fluid handling system (e.g., a water pump or intensifier) and directs the fluid to a leak detector.

Figure 6:
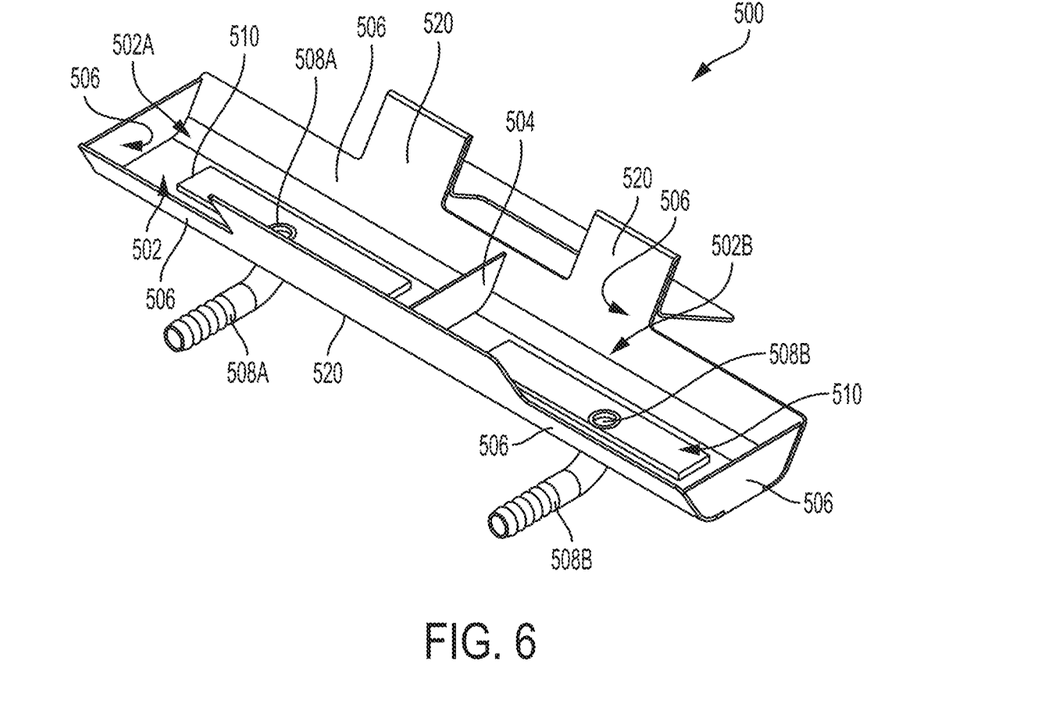
FIG. 6 is a perspective view of an example fluid collection and distribution tray for a fluid handling system to receive one or more fluids leaking from a component of the fluid handling system.
Figure 7:
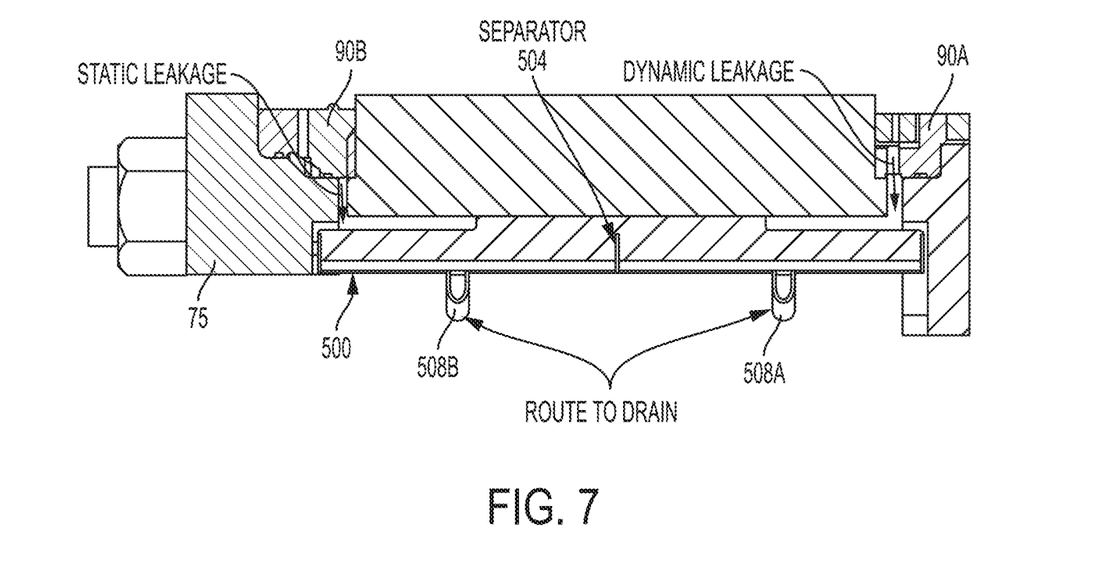
FIG. 7 is a cross sectional view of the example fluid collection and distribution tray, illustrating multiple sections and drains for receiving fluids and conveying multiple fluids from different leaking members.

For example, a collector tray 500 for a waterjet cutting system can include a settlement pan 502 divided into a first section 502A and a second section 502B. The first section 502A can be configured to receive a first leaking fluid from a first leaking member (e.g., a dynamic seal 90A) within the intensifier pump 75. The second section 502B can be configured to receive fluid from different leaking members, such as a second leaking fluid from a second leaking member (e.g., a static seal 90B) within the intensifier pump 75. In some cases, the tray 500 can include additional sections to receive fluid from other leaking members.

A set of walls 506 can surround the settlement pan 502 to form a first fluid reservoir that collects the first fluid and permits particulates (e.g., dirt, sludge, debris, etc.) in the first fluid to settle and accumulate within the first section 502A. The walls 506 can also form a second fluid reservoir that collects the second fluid and permits particulates in the second fluid to settle and accumulate. Providing a place for particulates to settle can help the leak detector work more efficiently or effectively. For example, removing particulates from the fluid can help the fluid flow through the tubing more easily, and also limit errors from the optical sensor since the particulates won't obstruct and trip the sensor. That is, particulates can also make the tubing dirty over time. Thus, by using settlement pans, less sediment travels down the tubing, such that the tubing can remain cleaner longer (e.g., for longer periods of use), which means that the customer typically does not need to replace the tubes as frequently. As a result, maintenance, system downtime, and replacement part costs can be reduced.

The tray 500 can include a partition 504 separating fluid between the first and second sections. The partition can include a vertical wall that serves as a liquid barrier between the two sections.

To convey the fluid collected to one or more leak detectors, the tray can include one or more openings (e.g., drains). For example, the tray 500 can include a first drain 508A located in the first section 502A and a second drain 508B located in the second section 502B of the settlement pan. In some embodiments, one or more of the first and second drains 508A, 508B are positioned at an elevation above a lower surface 510 of the settlement pan. For example, the lower surface 510 can be positioned below inlets of the drains and the positioning of the drains at an elevation above the lower surface of the settlement pan forms an area in which particulates settle and accumulate.

Figure 8:
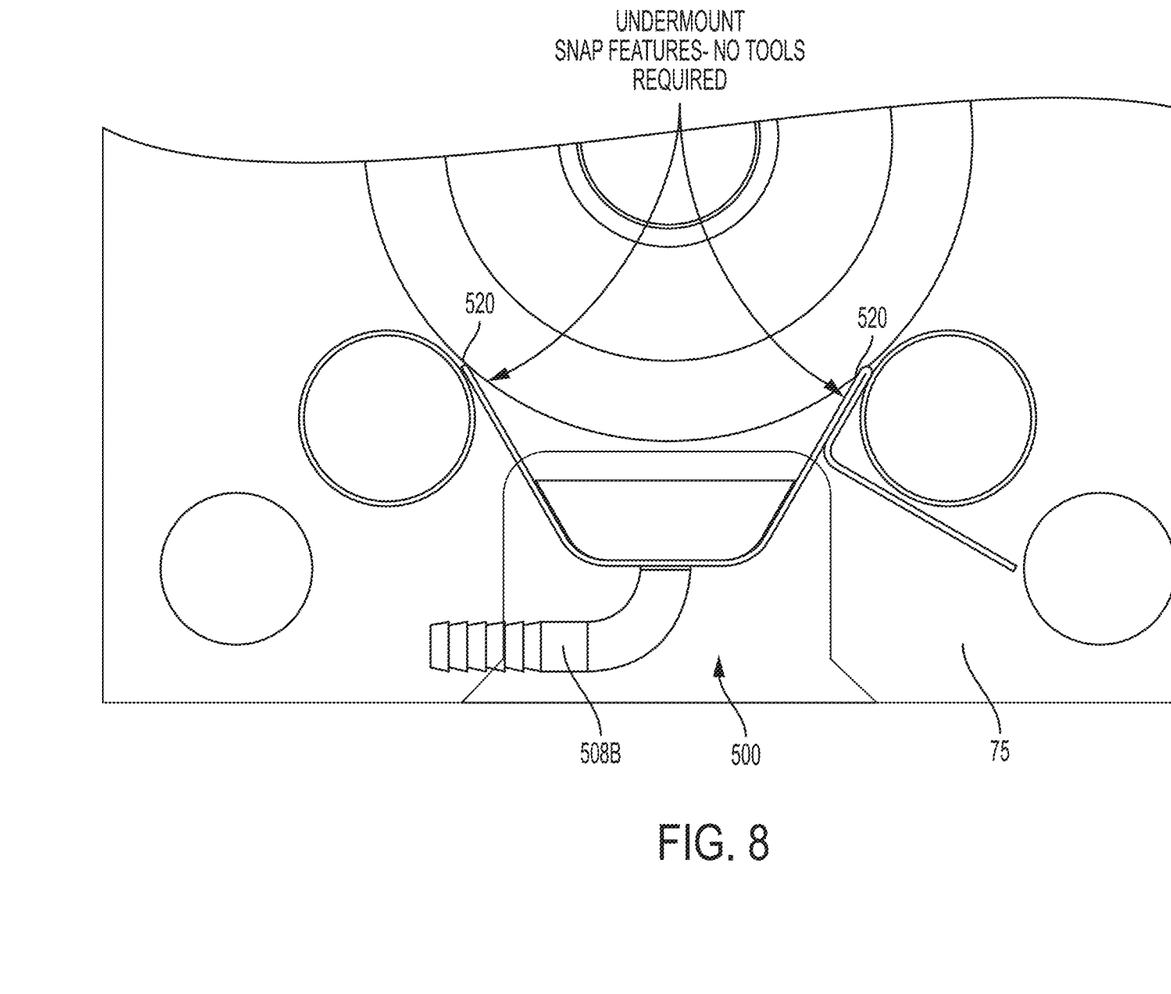
FIG. 8 is a side view of the example fluid collection and distribution tray, illustrating connection features attaching the tray to a fluid handling system.

The tray 500 can be configured to couple directly to a component of the system (e.g., directly to the pump 75). In some embodiments, the tray can include an attachment mechanism 520 for directly attaching the tray to a waterjet cutting system. In some cases, the attachment mechanism is configured to attach to the waterjet cutting system freely of a use of tools or fasteners (e.g., without a need for any additional tools or fasteners). For example, the tray can be configured to clip-on to the machine using one or more flexible, resilient clips or tabs. In some embodiments, the attachment mechanism 520 can be formed of a molded plastic or a thin metal material.

In some embodiments, the system can include a water/oil separator. In some cases, the separator can be integrated into the system, for example, downstream of the leak detectors. A water/oil separator can be used to separate oil and water drainage and allow the water to drain while the oil is retained/collected for processing and disposal. In some embodiments, the respective proportions of water and oil may be measured and compared to further determine/analyze system fitness and performance/life.

The systems and devices described herein can be implemented to carry out any of various methods for operating pressurized systems. For example, in some embodiments, electronic methods of determining a flow rate of a fluid leaking from a leaking member (e.g., sealing component) within a pressurized chamber of a pump can first include providing a drop detector fluidly coupled to the pressurized chamber. For example, in some embodiments, the drop detectors includes any of the various leak detectors described herein.

The methods can next include routing fluid (e.g., drops of the fluid) from the leaking member within the pressurized chamber to the drop detector. For example, fluid leaking from the leaking member can be routed to the drop detector using tubing. In some cases, fluid can be collected in a tray (e.g., a drop collection and distribution tray) and then routed to the drop detector. Additionally or alternatively, in some cases, fluid can be directed directly from the sealing component through the optical gate (e.g., with no tubing required).

Next, the methods can include, using the drop detector, measuring a number of drops of the fluid (e.g., a frequency of drop or an ongoing fluid flow) expelled from the leaking member and passing by the drop detector. For example, as discussed in detail above, the drop detector can use optical sensors to detect drops of fluid as they pass by the detector.

An electronic signal indicating the number of drops from the drop detector can then be sent to a computerized controller. Using the computerized controller, an estimated flow rate of the fluid can be determined based on the measured number of drops. For example, as detailed above, a flow rate of the fluid can be determined based on the size of a drop (e.g., a distance or time between a front surface and the rear surface of the drop), the speed at which the drop passes by the sensor, the cross-sectional area of the inner diameter of the tubing in which the fluid flows, among other factors.

The methods can next include alerting a user to a leaking sealing component for attention. That is, responsive to determining that the estimated flow rate of the fluid exceeds a threshold amount of flow, a fault signal can be issued. For example, the fault signal can be issued on the graphical user interface (GUI).

Figure 5:
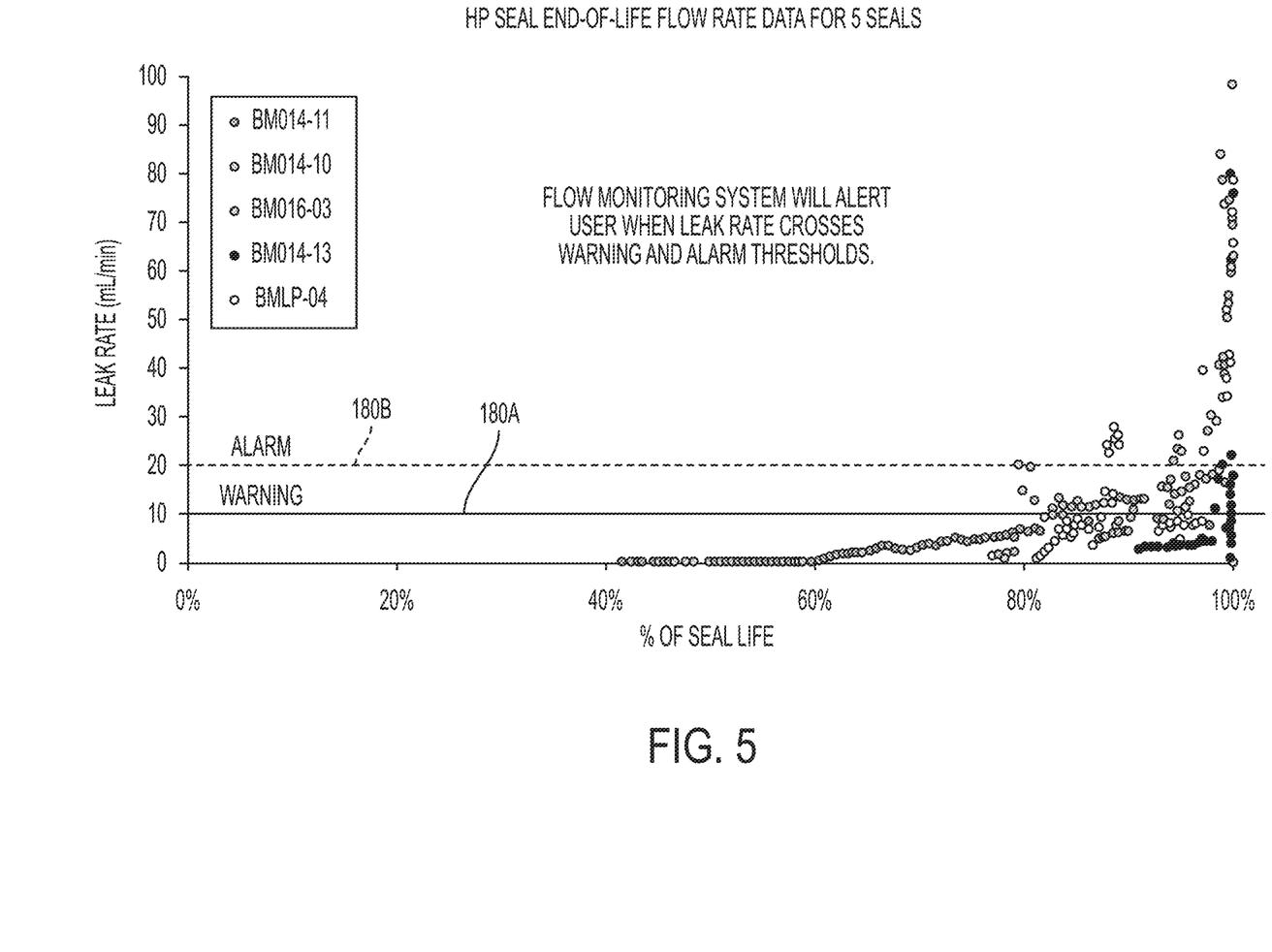
FIG. 5 is a chart of example detected leak flow rates of a fluid leaking from a leaking member as compared to a percentage of the leaking member's usable life, depicting example threshold flow rate levels at which signals can be issued.

Different fault signals can be issued to indicate different characteristics of the leaking sealing component, such as a sealing component that requires attention or a sealing component that has completely failed in the system. For example, in some cases, the fault signal can include a warning (e.g., a watch warning) can be issued in response to determining that the estimated flow rate exceeds a threshold of at least about 5 milliliters per minute (e.g., at least about 10 milliliters per minute). In some examples, the fault signal can include an order to replace the leaking member (e.g., an alarm) in response to determining that the estimated flow rate exceeds a threshold of at least about 15 milliliters per minute (e.g., at least about 20 milliliters per minute). Of course, these example flow rates are provided for reference and other specific values can be used for thresholds. For example, FIG. 5 illustrates plot of percentages of seal life (e.g., an amount of a seal's usable life that has been spent) relative to a flow rate of leaking fluid being expelled from the seal. As depicted, the system can be configured to issue an alert (e.g., a warning) at a first lower threshold 180A and an alarm at a second higher threshold 180B.

Similar methods of monitoring a leaking sealing component can be implemented for additional sealing components within the system. Using multiple sealing members and multiple leak detectors coupled thereto, as described in the various embodiments illustrated and discussed above, complete pump systems having two, three, four or more seals, can be monitored to alert a user as to when one or more of the seals should be replaced.

While the systems and methods described herein have been described as being implemented primarily with respect to waterjet cutting systems, other implementations are possible. Thus, the systems and methods for detecting fluid leaks in pressurized systems described herein can be used in other types of systems that pressurize fluids (e.g., liquids) including various pumping systems.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A waterjet cutting pressurization system, the system comprising:
   a water pump: (i) having a pressurization chamber and (ii) having a high-pressure water seal maintaining water pressure within the chamber; and
   a leak detector in fluid communication with the high-pressure water seal and configured to monitor a leak rate of a fluid from the high-pressure water seal, wherein the leak detector is configured to measure a temperature of the fluid.

2. The system of claim 1, wherein the leak detector is configured to measure a number of discrete drops of the fluid leaking from the high pressure water seal.

3. The system of claim 1, wherein the leak detector comprises an optical sensor.

4. The system of claim 1, wherein the pressurization system comprises two or more leak detectors, each leak detector configured to monitor a leak rate of the fluid from a different seal.

5. The system of claim 4, wherein the pressurization system comprises three or more leak detectors.

6. The system of claim 1, further comprising a second leak detector coupled to the pressurization chamber.

7. The system of claim 1, wherein the pressurization chamber is a first pressurization chamber and the water pump has a second pressurization chamber mechanically coupled to the first pressurization chamber.

8. The system of claim 7, further comprising a second seal maintaining water pressure within the chamber within the second pressurization chamber and a second leak detector configured to monitor a leak rate of the fluid from the second seal within the second pressurization chamber.

9. The system of claim 1, further comprising a leak collector tray that captures leaks from the water pump and directs them to the leak detector.

10. The system of claim 1, wherein the leak detector determines a volumetric flow rate of the fluid from the seal.

11. The system of claim 1, wherein the leak detector is in communication with a computerized controller.

12. The system of claim 1, wherein the leak detector is in communication with a graphical user interface (GUI).

13. The system of claim 1, further comprising a fluid flow path coupled to the water pump to convey the fluid from the high-pressure water seal to the leak detector.

14. The system of claim 1, wherein the system is a high pressure liquid cutting system.

15. The system of claim 1, wherein the leak detector being configured to monitor a leak rate of a fluid from the high-pressure water seal comprises being configured to detect an extended flow of fluid.

16. A waterjet cutting pressurization system comprising:
    an intensifier water pump comprising:
    (i) a first pressurization chamber and a first high-pressure seal disposed within the first pressurization chamber; and
    (ii) a second pressurization chamber and a second high-pressure seal disposed within the second pressurization chamber; and
    a first leak detector fluidly coupled to the first high-pressure seal and configured to monitor a first leak rate of a first fluid from the first high-pressure seal; and
    a second leak detector fluidly coupled to the second high-pressure seal and configured to monitor a second leak rate of a second fluid from the second high-pressure seal,
    wherein at least one of the first leak detector and the second leak detector is configured to measure a temperature of the first fluid or the second fluid.

17. The waterjet cutting pressurization system of claim 16, further comprising a fluid flow component coupled to the first pressurization chamber and a third leak detector fluidly coupled to the fluid flow component.

18. The waterjet cutting pressurization system of claim 17, wherein the first high-pressure seal comprises a high-pressure dynamic seal and the fluid flow component comprises a high-pressure static seal.

19. The waterjet cutting pressurization system of claim 18, wherein the fluid flow component comprises one of: a check valve, tubing, or a high-pressure fitting.

20. The waterjet cutting pressurization system of claim 16, further comprising a second fluid flow component coupled to the second pressurization chamber and a leak detector fluidly coupled to the second fluid flow component coupled to the second pressurization chamber.

21. The waterjet cutting pressurization system of claim 20, wherein the second high-pressure seal comprises a high-pressure dynamic seal and the second fluid flow component coupled to the second pressurization chamber comprises a high-pressure static seal.

22. The waterjet cutting pressurization system of claim 21, wherein the second fluid flow component coupled to the second pressurization chamber comprises one of: a check valve, tubing, or a high-pressure fitting.

23. An electronic method of determining a flow rate of a fluid leaking from a leaking member within a pressurized chamber of a pump, the method comprising:
    providing a drop detector fluidly coupled to the pressurized chamber;

routing drops of the fluid from the leaking member within the pressurized chamber to the drop detector;

measuring, using the drop detector, a number of drops of the fluid expelled from the leaking member and passing by the drop detector;

measuring, using the drop detector, a temperature of the fluid;

sending an electronic signal indicating the number of drops from the drop detector to a computerized controller;

determining, using the computerized controller, an estimated flow rate of the fluid based on the measured number of drops; and responsive to determining that the estimated flow rate of the fluid exceeds a threshold, issuing a fault signal.

24. The method of claim 23, wherein the method is performed by a waterjet cutting system.

25. The method of claim 23, wherein the drop detector comprises an optical sensor.

26. The method of claim 23, further comprising collecting a series of drops of the fluid in a collection tray prior to the routing of individual drops to the drop detector.

27. The method of claim 23, wherein the issuing the fault signal comprises providing a signal on a graphical user interface (GUI).

28. The method of claim 23, wherein the leaking member comprises a chamber seal disposed within the pressurized chamber.

29. The method of claim 23, wherein the measuring the number of drops includes measuring a change in voltage of an electronic signal generated by a sensor within the drop detector.

30. The method of claim 23, wherein the fault signal comprises a watch warning in response to determining that the estimated flow rate exceeds a threshold of at least about 5 milliliters per minute.

31. The method of claim 23, wherein the fault signal comprises an order to replace the leaking member in response to determining that the estimated flow rate exceeds a threshold of at least about 15 milliliters per minute.

32. The method of claim 23, further comprising: providing a second leaking member disposed in a second pressurized chamber of the pump; providing a second drop detector fluidly coupled to the second pressurized chamber; routing drops of a second fluid from the second leaking member to the second drop detector; measuring, using the second drop detector, a number of drops of the fluid expelled from the second leaking member and passing by the second drop detector; sending an electronic signal indicating the number of drops from the second drop detector to the computerized controller; determining, using the computerized controller, an estimated flow rate of the fluid based on the measured number of drops; and responsive to determining that the estimated flow rate of the fluid exceeds a threshold, issuing a fault signal.

33. The method of claim 23, wherein the fault signal corresponds to a remaining usable life of the leaking member.

34. The method of claim 23, wherein the fault signal alerts a user that the leaking member has failed and needs to be replaced.

35. The method of claim 23, wherein the estimated flow rate of the fluid corresponds to a remaining usable life of the leaking member.

36. A waterjet cutting pressurization system, the system comprising:

a water pump: (i) having a pressurization chamber and (ii) having a high-pressure water seal maintaining water pressure within the chamber; and a leak detector in fluid communication with the high-pressure water seal and configured to monitor a leak rate of a fluid from the high-pressure water seal, wherein the leak detector is configured to detect a length of individual drops of the fluid.

37. A waterjet cutting pressurization system, the system comprising:

a water pump: (i) having a pressurization chamber and (ii) having a high-pressure water seal maintaining water pressure within the chamber;

a leak detector in fluid communication with the high-pressure water seal and configured to monitor a leak rate of a fluid from the high-pressure water seal; and a controller configured to determine an estimated flow rate of the fluid based on an estimated volume of a drop of the fluid.

38. A waterjet cutting pressurization system comprising:

an intensifier water pump comprising:
(i) a first pressurization chamber and a first high-pressure seal disposed within the first pressurization chamber; and
(ii) a second pressurization chamber and a second high-pressure seal disposed within the second pressurization chamber; and a first leak detector fluidly coupled to the first high-pressure seal and configured to monitor a first leak rate of a first fluid from the first high-pressure seal; and a second leak detector fluidly coupled to the second high-pressure seal and configured to monitor a second leak rate of a second fluid from the second high-pressure seal, wherein at least one of the first leak detector and the second leak detector is configured to detect a length of individual drops of the first fluid or the second fluid.

39. A waterjet cutting pressurization system comprising:

an intensifier water pump comprising:
(i) a first pressurization chamber and a first high-pressure seal disposed within the first pressurization chamber; and
(ii) a second pressurization chamber and a second high-pressure seal disposed within the second pressurization chamber; and a first leak detector fluidly coupled to the first high-pressure seal and configured to monitor a first leak rate of a first fluid from the first high-pressure seal; and a second leak detector fluidly coupled to the second high-pressure seal and configured to monitor a second leak rate of a second fluid from the second high-pressure seal, wherein at least one of the first leak detector and the second leak detector is configured to determine an estimated flow rate based on an estimated volume of a drop of the first fluid or the second fluid.

40. An electronic method of determining a flow rate of a fluid leaking from a leaking member within a pressurized chamber of a pump, the method comprising:

providing a drop detector fluidly coupled to the pressurized chamber;

routing drops of the fluid from the leaking member within the pressurized chamber to the drop detector;

measuring, using the drop detector, a number of drops of the fluid expelled from the leaking member and passing by the drop detector and a length of individual drops;

sending an electronic signal indicating the number of drops from the drop detector to a computerized controller;

determining, using the computerized controller, an estimated flow rate of the fluid based on the measured number of drops; and responsive to determining that the estimated flow rate of the fluid exceeds a threshold, issuing a fault signal.

41. An electronic method of determining a flow rate of a fluid leaking from a leaking member within a pressurized chamber of a pump, the method comprising:

providing a drop detector fluidly coupled to the pressurized chamber;

routing drops of the fluid from the leaking member within the pressurized chamber to the drop detector;

measuring, using the drop detector, a number of drops of the fluid expelled from the leaking member and passing by the drop detector;

sending an electronic signal indicating the number of drops from the drop detector to a computerized controller;

determining, using the computerized controller, an estimated flow rate of the fluid based on the measured number of drops and an estimated volume of a drop; and responsive to determining that the estimated flow rate of the fluid exceeds a threshold, issuing a fault signal.

* * * * *